United States Patent
Maillot et al.

(10) Patent No.: US 9,471,996 B2
(45) Date of Patent: Oct. 18, 2016

(54) METHOD FOR CREATING GRAPHICAL MATERIALS FOR UNIVERSAL RENDERING FRAMEWORK

(75) Inventors: Jerome Maillot, Cazaux (FR); Andre Gauthier, Quebec (CA); Daniel Levesque, Brossard (CA)

(73) Assignee: AUTODESK, Inc., San Rafael, CA (US)

( * ) Notice: Subject to any disclaimer, the term of this patent is extended or adjusted under 35 U.S.C. 154(b) by 807 days.

(21) Appl. No.: 12/040,725

(22) Filed: Feb. 29, 2008

(65) Prior Publication Data
US 2009/0222469 A1     Sep. 3, 2009

(51) Int. Cl.
| G09G 5/00 | (2006.01) |
| G06T 11/00 | (2006.01) |
| G06T 15/04 | (2011.01) |
| G06F 9/44 | (2006.01) |
| G06F 3/14 | (2006.01) |
| G06T 15/00 | (2011.01) |

(52) U.S. Cl.
CPC ............. *G06T 11/001* (2013.01); *G06T 15/04* (2013.01); *G06F 3/14* (2013.01); *G06F 9/4443* (2013.01); *G06T 15/005* (2013.01)

(58) Field of Classification Search
CPC ... G06T 11/001; G06T 15/04; G06T 15/005; G06F 9/4443; G06F 3/14
USPC ........ 382/154; 345/418, 426, 582, 506, 422, 345/421, 619; 707/609, 705; 717/106, 717
See application file for complete search history.

(56) References Cited

U.S. PATENT DOCUMENTS

| | | | |
|---|---|---|---|
| 5,481,665 A | 1/1996 | Okada et al. | |
| 5,604,824 A | 2/1997 | Chui et al. | |
| 5,687,304 A | 11/1997 | Kiss | |
| 5,696,892 A | 12/1997 | Redmann et al. | |
| 5,710,878 A | 1/1998 | McCoy et al. | |
| 5,790,131 A | 8/1998 | Liang et al. | |
| 5,835,093 A | 11/1998 | Fujishita et al. | |
| 5,886,701 A | 3/1999 | Chauvin et al. | |
| 5,991,770 A | 11/1999 | Zamora-McKelvy et al. | |
| 6,128,540 A | 10/2000 | Van Der Vegt et al. | |
| 6,151,624 A | 11/2000 | Teare et al. | |
| 6,456,288 B1 | 9/2002 | Brockway et al. | |
| 6,518,989 B1 | 2/2003 | Ishikawa | |
| 6,867,781 B1 | 3/2005 | Van Hook et al. | |
| 6,947,037 B1 * | 9/2005 | Lynn et al. | 345/419 |
| 7,023,437 B1 * | 4/2006 | Voorhies et al. | 345/420 |
| 7,266,616 B1 | 9/2007 | Munshi et al. | |

(Continued)

OTHER PUBLICATIONS

"Mental Mill Functional Overview", Mental Images GmbH, White Paper, Feb. 11, 2007. 15 pgs.

(Continued)

*Primary Examiner* — Abderrahim Merouan
(74) *Attorney, Agent, or Firm* — Artegis Law Group, LLP

(57) ABSTRACT

Embodiments of the invention provide a renderer-agnostic method for representing materials independently from an underlying rendering engine. Advantageously, materials libraries may be extended with new materials for rendering with an existing rendering engine and implementation. Also, new rendering engines and implementations may be added for existing materials. Thus, at run-time, rather than limiting the rendering to being performed on a pre-determined rendering engine, the rendering application may efficiently and conveniently manage rendering a graphics scene on a plurality of rendering engines or implementations.

26 Claims, 7 Drawing Sheets

(56) References Cited

U.S. PATENT DOCUMENTS

| | | | |
|---|---|---|---|
| 7,307,640 B2 * | 12/2007 | Demers et al. | 345/584 |
| 7,423,653 B2 * | 9/2008 | Gettman et al. | 345/587 |
| 7,523,411 B2 | 4/2009 | Carlin | |
| 7,596,418 B2 | 9/2009 | Bugosh | |
| 7,624,349 B2 | 11/2009 | Seemann et al. | |
| 7,629,985 B2 | 12/2009 | McArdle et al. | |
| 7,701,461 B2 | 4/2010 | Fouladi et al. | |
| 7,878,148 B2 | 2/2011 | Swenson et al. | |
| 8,553,028 B1 * | 10/2013 | Urbach | G06T 15/005 345/419 |
| 8,620,635 B2 * | 12/2013 | Rubin | G06F 17/50 703/2 |
| 2002/0030689 A1 | 3/2002 | Eichel et al. | |
| 2002/0039101 A1 | 4/2002 | Fernandez et al. | |
| 2003/0031371 A1 | 2/2003 | Kato et al. | |
| 2003/0167213 A1 | 9/2003 | Jammes et al. | |
| 2003/0226116 A1 | 12/2003 | Kuwata et al. | |
| 2004/0109563 A1 | 6/2004 | Evans et al. | |
| 2004/0162845 A1 | 8/2004 | Kim et al. | |
| 2004/0174998 A1 | 9/2004 | Youatt et al. | |
| 2004/0239679 A1 | 12/2004 | Ito et al. | |
| 2005/0081161 A1 | 4/2005 | MacInnes et al. | |
| 2005/0088447 A1 | 4/2005 | Hanggie et al. | |
| 2005/0125747 A1 | 6/2005 | Nelson et al. | |
| 2005/0237335 A1 | 10/2005 | Koguchi et al. | |
| 2005/0267721 A1 | 12/2005 | Thalhammer-Reyero | |
| 2006/0039674 A1 | 2/2006 | Sonoda et al. | |
| 2006/0072164 A1 | 4/2006 | Kato et al. | |
| 2006/0098023 A1 | 5/2006 | Coulthard | |
| 2006/0101431 A1 | 5/2006 | Pepin et al. | |
| 2006/0164414 A1 * | 7/2006 | Farinelli | G06T 15/40 345/422 |
| 2006/0176316 A1 | 8/2006 | Nagasaki et al. | |
| 2006/0232583 A1 * | 10/2006 | Petrov et al. | 345/419 |
| 2006/0242164 A1 | 10/2006 | Evans et al. | |
| 2006/0253214 A1 | 11/2006 | Gross | |
| 2006/0294125 A1 | 12/2006 | Deaven | |
| 2007/0018990 A1 * | 1/2007 | Shreiner | 345/505 |
| 2007/0018996 A1 | 1/2007 | Wang et al. | |
| 2007/0060345 A1 * | 3/2007 | Edwards | 463/31 |
| 2007/0060346 A1 * | 3/2007 | Edwards | 463/31 |
| 2007/0083805 A1 | 4/2007 | Randazzo et al. | |
| 2007/0165035 A1 * | 7/2007 | Duluk et al. | 345/506 |
| 2007/0195085 A1 | 8/2007 | Farinelli | |
| 2007/0233678 A1 | 10/2007 | Bigelow | |
| 2007/0268297 A1 | 11/2007 | Novosad | |
| 2008/0088630 A1 * | 4/2008 | Bakalash et al. | 345/505 |
| 2008/0091491 A1 * | 4/2008 | Thorpe et al. | 705/7 |
| 2008/0266296 A1 | 10/2008 | Ramey et al. | |
| 2009/0073187 A1 | 3/2009 | Rampson et al. | |
| 2009/0138113 A1 | 5/2009 | Hoguet | |
| 2009/0160856 A1 | 6/2009 | Hoguet | |
| 2009/0180149 A1 * | 7/2009 | Drake et al. | 358/2.1 |
| 2009/0222469 A1 | 9/2009 | Maillot et al. | |
| 2009/0251478 A1 | 10/2009 | Maillot et al. | |
| 2009/0254611 A1 | 10/2009 | Pena et al. | |
| 2009/0265301 A1 * | 10/2009 | Chen | G06F 17/30286 |
| 2010/0046846 A1 | 2/2010 | Brown | |

OTHER PUBLICATIONS

Office Action dated Aug. 6, 2009 for German Pat. App. No. 102009007334.5.

English Translation of Office Action dated Aug. 6, 2009 for German Pat. App. No. 102009007334.5.

"Bildsynthese" (German), Wikipedia, available at http://de.wikipedia.org/wiki/Bildsynthese, Aug. 2009.

"Grafikpipeline" (German), Wikipedia, available at http://de.wikipedia.org/wiki/Grafikpipeline Aug. 2009.

"Textur (Computergrafik)" (German), Wikipedia, available at http://de.wikipedia.org/wiki/Textur_(Computergrafik)., Aug. 2009.

"Texture Mapping" (German), Wikipedia, available at http://de.wikipedia.org/wiki/Texture_Mapping, Aug. 2009.

"Image Synthesis," English Translation of "Bildsynthese" (German), Aug. 2009.

"Graphics Pipeline," English Translation of "Grafikpipeline" (German), Aug. 2009.

"Texture (Computer Graphics)," English Translation of "Textur (Computergrafik)" (German), Aug. 2009.

"Texture Mapping," English Translation of "Texture Mapping" (German), Aug. 2009.

Office Action, U.S. Appl. No. 12/040,659 dated Feb. 10, 2011.

Office Action in U.S. Appl. No. 12/250,458 mailed Feb. 3, 2012.

Office action dated Jan. 27, 2012 for U.S. Appl. No. 12/259,205.

Office Action in U.S. Appl. No. 12/099,753 mailed Mar. 2, 2011.

Final Office Action dated Jul. 19, 2012 for U.S. Appl. No. 12/259,205.

* cited by examiner

METHOD FOR CREATING GRAPHICAL MATERIALS FOR UNIVERSAL RENDERING FRAMEWORK

BACKGROUND OF THE INVENTION

1. Field of the Invention

The present invention generally relates to computer software. More specifically, the present invention relates to a rendering application configured to perform a renderer-agnostic method for representing materials independently from an underlying rendering engine.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable two-dimensional (2D) or three-dimensional (3D) construct. A rendering application may then be used to generate an image from a CAD model. Rendering is also used to describe the process of calculating effects in a video editing file to produce final video output.

A rendering application can simulate the appearance of real-world textures, colors, surface shadows, highlights, and reflections by giving the final appearance to the models and animation. As a product, rendering applications come in many forms. Some rendering applications are integrated into larger modeling, animation, and CAD packages, while others are stand-alone applications. Functionally, the rendering process is a carefully engineered program, based on a selective mixture of techniques related to light physics, visual perception, mathematics, and software development.

Rendering applications can be implemented in hardware or software. In the case of software rendering, the actual rendering process is a computationally intensive process that is frequently used for motion picture creation. Typically, software rendering is not done in real time, i.e., rendering takes longer to render a single frame than that frame is displayed. However, software based rendering may produce very high-quality images, as the renderer is not constrained by frame-rate requirements. In contrast, real-time rendering, implemented on graphics cards with 3D hardware accelerators, is frequently used in video games and is often implemented on graphics cards with 3D hardware accelerators.

Software-based rendering engines include Maya, StudioMax, Renderman, Vray and Mental Ray, among others. Similarly, sophisticated 3D graphics APIs, such as DirectX and OpenGL, may be used to control hardware-based graphics rendering pipelines. Given this assortment or available rendering tools, each having unique advantages and disadvantages, users often desire to use one rendering engine for certain purposes and another rendering engine for other purposes For example, Mental Ray™ is a powerful ray tracing rendering tool, while RenderMan™ is known to be an efficient scan-line based rendering tool. Depending on the desired effect, the user may favor one of these rendering approaches over the other.

To switch rendering engines, however, the user must understand the interface and configuration for each rendering engine. For example, to achieve a desired rendering effect using Mental Ray, the user may have to specify which dynamic library should be loaded, specify a Mental Ray file describing an interface to a shader, and specify a set of parameters. Switching to a different rendering engine may require the user to specify a completely different set of libraries, files, and parameters particular to that rendering engine. Furthermore, the users of these rendering tools oftentimes do not have a high degree of sophistication in computer programming. For example, architects, illustrators, and engineers, who may be familiar with the desired properties of rendered surfaces (e.g., whether a painted wall surface should have a glossy or matte appearance, or how graveled a concrete pathway should appear), may nonetheless lack an understanding of the rendering settings needed to achieve these effects using a given type rendering engine.

Currently, attempts at high-level rendering frameworks do not allow for the implementation of different rendering engines. For example, Autodesk® ImageStudio™ makes use of user facades to make rendering more user-friendly. However, ImageStudio™ does not allow for the implementation of multiple renderers. Also, Mental Images® MetaSL™ (in conjunction with the Mental Mill® application) allows users to write a shader once, and then translate the shader into an appropriate language for rendering. However, the MetaSL™ approach makes the assumption that the same implementation can be used for multiple rendering engines. This is typically not the case. A material implementation written for a ray tracer is unlikely to run or perform well in a scanline renderer or a hardware renderer. The MetaSL™ approach also requires the programmers to us a specific abstract language, instead of the native renderer API.

Accordingly, there remains a need in the art for a renderer-agnostic method for representing materials implemented in multiple rendering engines.

SUMMARY OF THE INVENTION

Embodiments of the invention provide a renderer-agnostic method for representing materials independently from an underlying rendering engine. Advantageously, materials libraries may be extended with new materials for rendering with an existing rendering engine and implementation. Also, new rendering engines and implementations may be added for existing materials. An implementation of a given material may tailored for each underlying rendering engine. For example, each implementation may be written in the native language associated with a particular rendering engine, optimizing both efficiency and rendering quality. Thus, at run-time, rather than limiting the rendering to being performed on a pre-determined rendering engine, the rendering application may efficiently and conveniently manage rendering a graphics scene on a plurality of rendering engines or implementations according to user preference.

One embodiment of the invention includes a method for rendering a graphics scene. The method may generally include accessing a graphics scene file that includes a set of geometry and displaying a set of material parameters associated with a first material included in a set of materials. Each material parameter may specify a characteristic of the first material to use in a rendering operation in which the first material is applied to geometry included in the scene. The method may further include receiving a selection of a parameter value for each material parameter in the set of material parameters, translating the parameter values for the first material into a format associated with a first rendering implementation, and rendering the geometry to which the first material is applied using the first rendering implementation and the translated parameter values.

Another embodiment of the invention includes a method for creating materials that may be applied to geometry within a graphics scene. The method may generally include loading a materials library that includes a definition for each of a plurality of materials. The definition for each material may include a set of strongly-typed parameters representing characteristics of a material and specify one or more rendering implementations associated with the material. The method may further include receiving a selection of a first material from the materials library, receiving a modification to the definition of the first material, and storing the modified first material in the materials library, in addition to the first material.

DETAILED DESCRIPTION OF THE PREFERRED EMBODIMENTS

Figure 1:
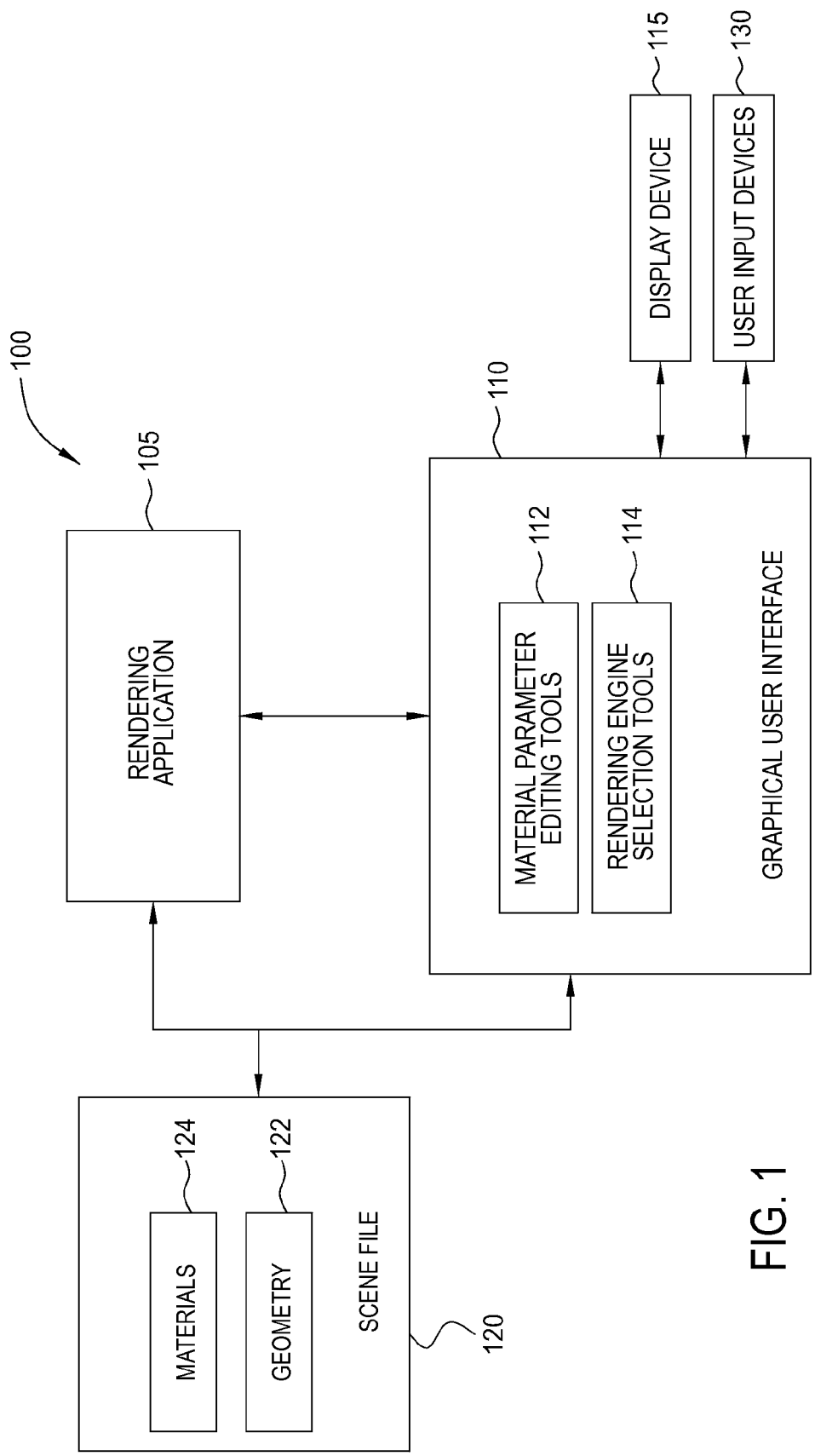
FIG. 1 is a block diagram illustrating components of a rendering application configured to perform a renderer-agnostic method for representing materials independently from an underlying rendering engine, according to one embodiment of the invention.

FIG. 1 is a block diagram illustrating components of a rendering application configured to perform a renderer-agnostic method for representing materials independently from an underlying rendering engine, according to one embodiment of the invention. The components illustrated FIG. 1 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with rendering application 105 at another physical location. Also, in one embodiment, rendering application 105 and graphical user interface 110 may be provided as an application program (or programs) stored on computer readable media such as a CD-ROM, DVD-ROM, flash memory module, or other tangible storage media.

As shown, a system 100 includes, without limitation, rendering application 105, graphical user interface 110, scene file 120, user input devices 130, and a display device 115. Those skilled in the art will recognize, however, that the components shown in FIG. 1 are simplified to highlight aspects of the present invention and that a typical rendering application 105 and GUI interface 110 may include a broad variety of additional tools and features used to compose and manage a design or drawing. Rendering application 105 may be configured to allow users interacting with GUI interface 110 to compose a graphical scene. Accordingly, rendering application 105 and GUI interface 110 may include programmed routines or instructions allowing users to create, edit, load, and save the scene file 120. User input devices 130 may include a mouse pointing device, a keyboard, a joystick or a video game controller and display device 115 may be a CRT or LCD display.

Also as shown, the scene file 120 includes geometry 122 and materials 124. Geometry 122 defines the 3D structure or shape of elements included in a scene. For example, the shape of a building or a human character. Typically, the geometry 122 is represented as a collection of polygons defined in a 3D space. As is known, rendering applications 105 frequently provide users with the ability to apply materials 124 to the geometry 122 in the scene file 120. A material 124 is a set of reusable appearance attributes. Using pre-defined materials 124 from a library of materials allows users to quickly change the look and feel of the scene. Examples of materials 124 include concrete, brick, wall paint, or any other texture, color, or appearance. Materials 124 are not limited to 2D and may also be volumetric, such as noise and fog.

Graphical user interface 110 provides tools used to manipulate the scene file 120 using rendering application 105. As shown in FIG. 1, graphical user interface 110 may include material parameter editing tools 112 and rendering engine selection tools 114. Those skilled in the art will recognize, however, that the tools of GUI interface 110 shown in FIG. 1 are simplified to highlight aspects of the present invention and that a typical rendering application 105 and GUI interface 110 may include a broad variety of additional tools and features used to compose and manipulate the scene file 120.

Material parameter editing tools 112 may provide graphical user interface elements that allow a user to edit the materials 124 applied to a particular collection of geometry 122 within a scene. The material parameter editing tools 112 may allow the user to define and modify physical, display, and meta properties of the material 124 to be applied to the particular geometry 122 in scene file 120, generally referred to herein as material parameters. Examples of material parameters include stroke weight, overshoot, spacing, paper type, hardness, darkness, angle, arc, transparency, texture, color, color variation, or any other parameters used to control the physical, display, or meta properties of a material 124 applied to the geometry 122 within a scene. Different material parameters may be implemented based on the material 124 being represented. For example, a material 124 representing brick could include height, width, and grout thickness parameters, whereas a material 124 representing wall paint could include color and finish parameters.

In one embodiment, the rendering engine selection tools 114 may provide graphical user interface elements that allow a user to select a particular rendering engine implementation for rendering portions of the geometry 122 from the scene file 120. Each implementation implements a given material for a given rendering engine. Further, an implementation written for a given rendering engine may be written using a native language used by that rendering engine without modifying user interface presented to the user for that material. For example, assume that the rendering application 105 is configured with three rendering engines, each capable of rendering a particular material. Each rendering engine could provide two implementations for rendering the material: a first, high-speed, low quality implementation and a second, low-speed, high-quality implementation. In this example, there are a total of six implementations capable of rendering the particular material. In such a case, the rendering engine selection tools 114 allow the user to select which implementation to use for rendering a given image from a list of available implementations.

In another embodiment, the rendering engine selection tools 114 may automatically select which rendering implementation to use for rendering based on some user selected context, preferences, or profile. For example, a user may select between "high quality" and "low quality" rendering, and the rendering application 105 determines which rendering implementation is most appropriate for rendering the scene.

Figure 2:
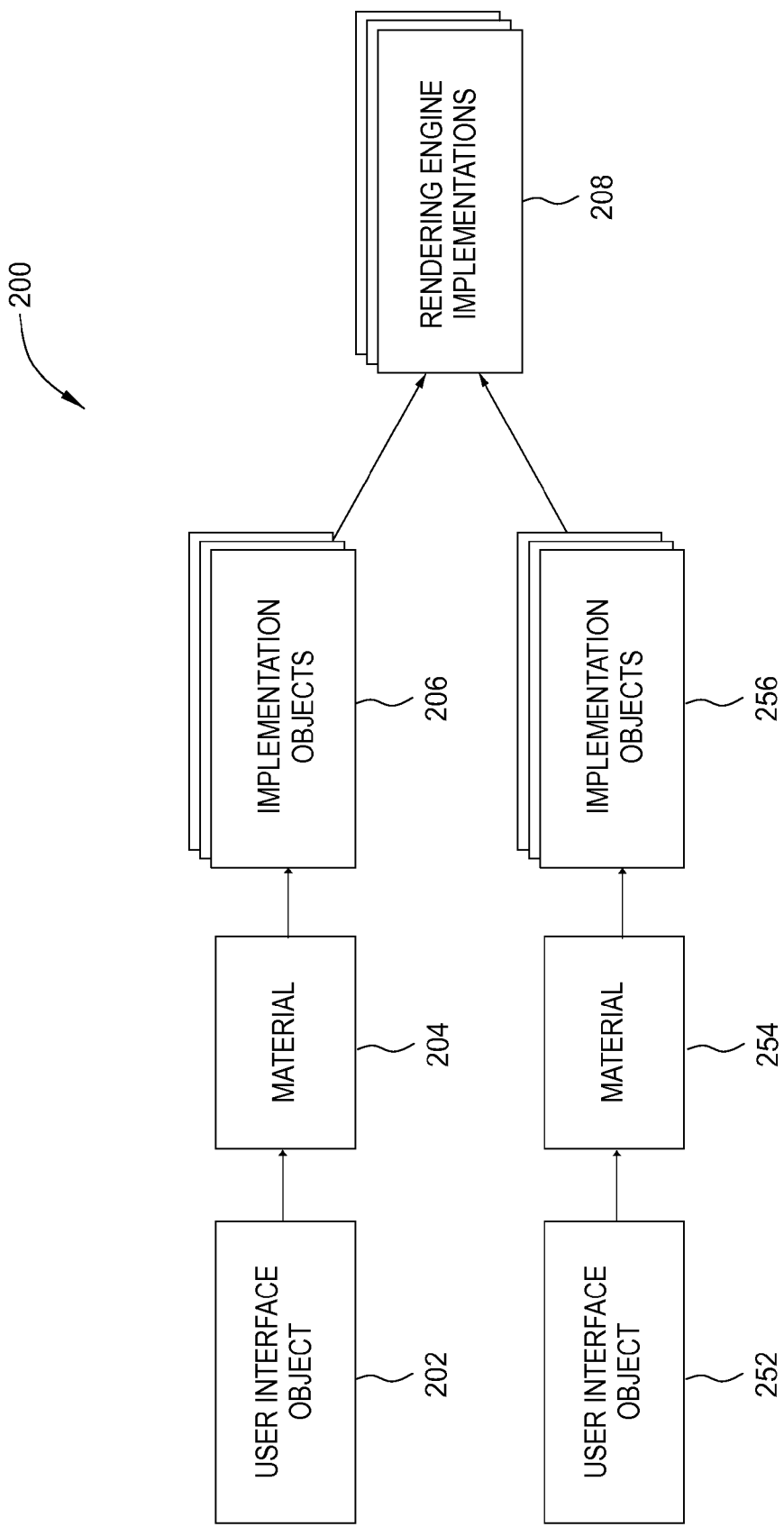
FIG. 2 is a conceptual drawing illustrating components of a system configured for rendering a graphics scene using a universal rendering framework, according to one embodiment of the invention.

FIG. 2 is a conceptual drawing illustrating components of a system configured for rendering a graphics scene using a universal rendering framework 200, according to one embodiment of the invention. As shown, a graphics application may be configured with the rendering framework 200 having four components: a collection of user interface objects 202, 252, a collection of material objects 204, 254, a collection of implementation objects 206, 256 for each material object 204, 254, and a collection of underlying rendering engine implementations 208. The underlying rendering engine implementations 208 may be software based (e.g., Mental Ray and RenderMan), as well as graphics APIs (e.g., OpenGL and DirectX) used to control different hardware rendering pipelines.

Each material object 204, 254 represents a different material class that may be rendered in a scene. Common examples of materials represented by material objects 204, 254 include a painted wall material, concrete materials, metal materials, glass materials, and water materials, etc. In one embodiment, each material object 204, 254 may include strongly-typed parameters representing the relevant characteristics of a given material. For example, a material object 204, 254 resenting a painted wall surface could include parameters for color, application or brush type, and finish. By strongly typing the parameters to the characteristics of the material object, users can easily identify the characteristics to use in rendering a given material type, without having to understand the particulars of an underlying rendering engine or understanding how to configure the underlying rendering engines to produce a desired appearance for surfaces in a rendered image.

In addition, by strongly typing the parameters to the characteristics of the material object 204, 254, the user interface objects 202, 252 may present the user with the appropriate user interface constructs, regardless of the underlying implementation object 206 or rendering engine implementations. For example, continuing with the example of a material object resenting a painted wall surface, the user interface object 202 may present the user the a color type parameter using interface elements that allow a user to specify an RGB color value, a code reference to a manufacturer catalog, or even sampled spectral values. Similarly, the user interface objects 202, 252 may present the user with drop-down lists for the application type and finish parameters. These drop-down lists could present values for a painted surfed familiar to an architect or designer, such as rolled, sprayed, brushed, matte, glossy, satin, etc. By decoupling the user interface from the material, the rendering framework enables different applications to adapt the user interface to the skills of the user. For example, a typical Autodesk® Revit® user will prefer to enter colors from a catalog while an Autodesk® 3ds Max® user may prefer to enter RGB values.

Implementation objects 206, 256 provide an interface between a given material 204, 254 and a given rendering engine 208. Generally, the implementation objects 206, 256 are configured to receive values for the strongly-typed parameters and also to translate these values into an appropriate form for one of the rendering engine implementations to achieve a desired rendering effect. The translation may be a simple pass-through, such as in the case of passing of RGB color values, but can also be a mapping from one value to another. Further, depending on the desired rendering effect, the underlying implementation object 206, 256 may generate multiple parameters from a single material parameter, may identify libraries, files, shader programs, textures, rendering parameters, or any other values used by a particular rendering engine to achieve a desired effect. By decoupling the rendering engine 208 from the materials 204, 254, the universal rendering framework may easily be extended with new rendering engines 208 by adding the appropriate implementation objects 206, 256 to allow a new rendering engine 208 to render existing materials 204, 254, presented to the user through user object interface 202, 252. Further, the universal rendering framework is also designed to be easily extended with new materials for existing rendering engines, as described in more detail in FIGS. 5 and 6A-6C.

Figure 3:
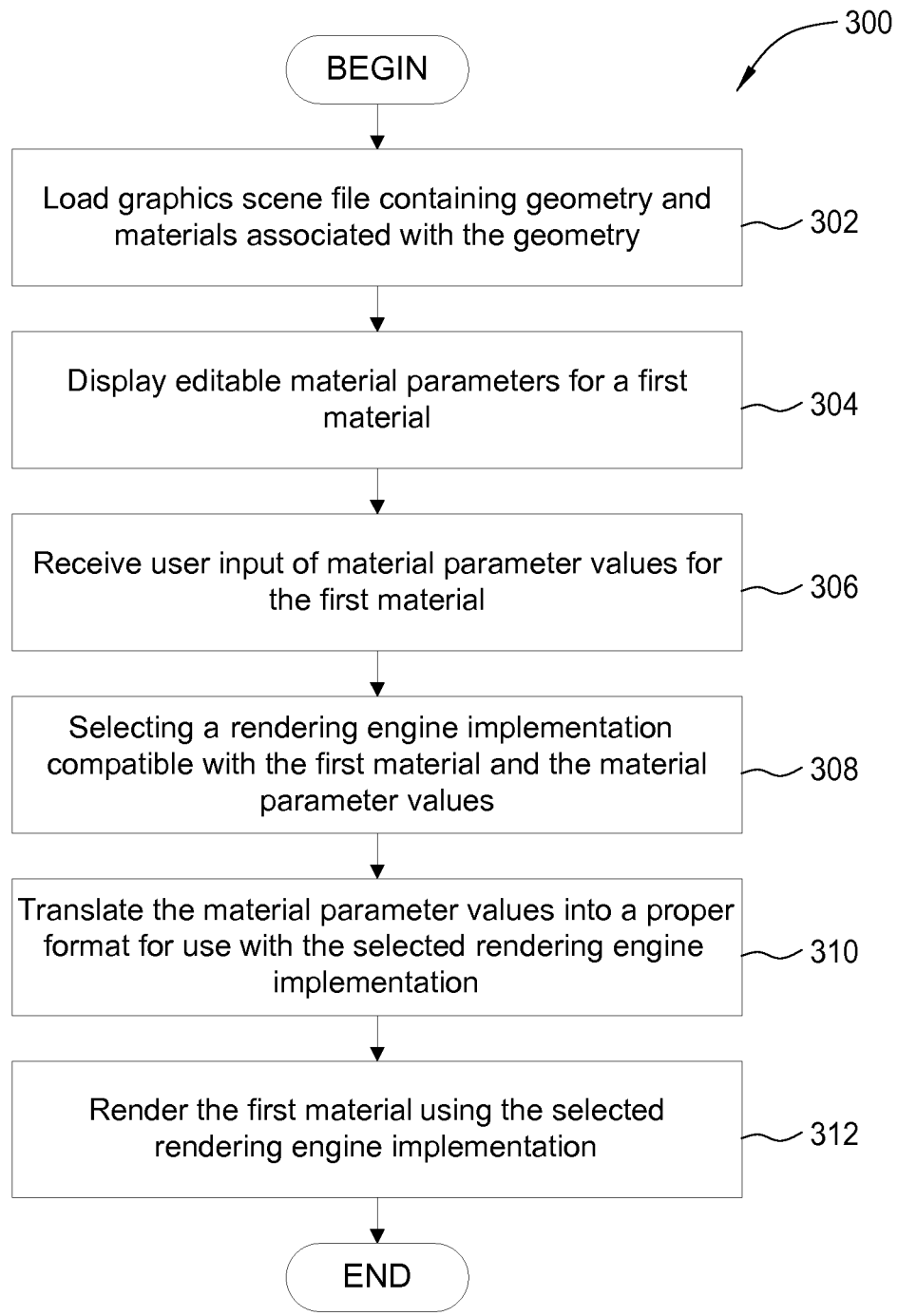
FIG. 3 is a flow chart illustrating a render-agnostic method for representing materials independently from an underlying rendering engine, according to one embodiment of the invention.

FIG. 3 is a flow chart illustrating a render-agnostic method for representing materials independently from an underlying rendering engine, according to one embodiment of the invention. Persons skilled in the art will understand that even though the method is described in conjunction with the systems of FIGS. 1 and 2, any system configured to perform the steps of the method illustrated in FIG. 3, in any order, is within the scope of the present invention.

As shown, the method 300 begins at step 302, where the graphics application loads a graphics scene file containing geometry and materials associated with the geometry. In one embodiment, each object in a graphics scene is composed of one or more pieces of geometry, e.g., a collection of triangles or polygons. Each piece of geometry may also be associated with a material to use in rendering that piece of geometry.

At step 304, the rendering application displays editable material parameters for a first material. As discussed above, each material may have different editable parameters based on the characteristics of the material.

At step 306, the rendering application receives user input of material parameter values for the first material. The material parameter values may be input numerically, chosen from a drop-down menu, or other manner. Further, in one embodiment, the material parameter values may be pre-set at default values for a given material and then modified by the user to achieve the desired effect.

At step 308, the rendering application selects a rendering engine implementation compatible with the first material and the material parameter values supplied at step 306. As described above, multiple rendering engines and multiple rendering implementations for each rendering engine may be available for rendering the first material. In one embodiment, the user may select the implementation and rendering engine to use, based on what implementations of the first material are available for a set of available rendering engines. Alternatively, the rendering application may be configured to use a default selection (or hierarchy of selections) to select which implementation to use in rendering the first material. Alternatively still, the rendering application may be selected based on a user-selected context. For example, the user may select "high quality" rendering or "low quality" rendering, and the rendering application determines the appropriate rendering implementation to use when rendering.

In yet another embodiment, the rendering application may select a different rendering implementation for each material to be rendered. Based on the context in which the user is rendering, the rendering application may choose an appropriate rendering engine and implementation. For example, if rendering an interactive application and rendering into an interactive view, then the rendering application may automatically select the fastest and lowest quality rendering implementation. Similarly, if rendering offline, the rendering application may select the highest quality implementation because rendering time may be less of a factor.

At step 310, the rendering application translates the material parameter values into a format required for use with the rendering implementation selected at step 308. For example, the implementation objects 206, 256, shown in FIG. 2, may use a translation table that maps from the strongly-typed material parameters values into the appropriate values used by the rendering implementation selected at step 308. At step 312, the rendering application renders the graphics scene file using the selected rendering engine. As described above, each material specified for portions of a scene may be rendered using a different rendering implementation.

Figure 4:
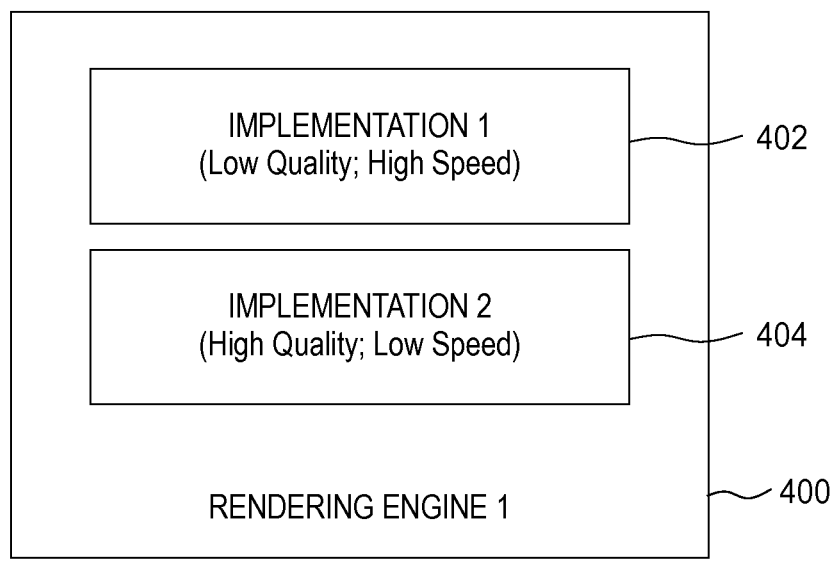
FIG. 4 is a block diagram illustrating multiple implementations of a rendering engine, according to one embodiment of the invention.

FIG. 4 is a block diagram illustrating multiple rendering implementations of a single rendering engine, according to one embodiment of the invention. Illustratively, rendering engine 400 includes first rendering implementation 402 and a second rendering implementation 404. As shown, the first rendering implementation 402 provides a low-quality, high-speed rendering implementation for a given material. This implementation may be appropriate when rendering in real-time, e.g., to give the user a quick impression of the appearance of a given material within a scene. The second rendering implementation 404 may be a high-quality, low-speed rendering implementation. This implementation may be appropriate when rendering a final version of a scene, giving more fine-grained results.

Figure 5:
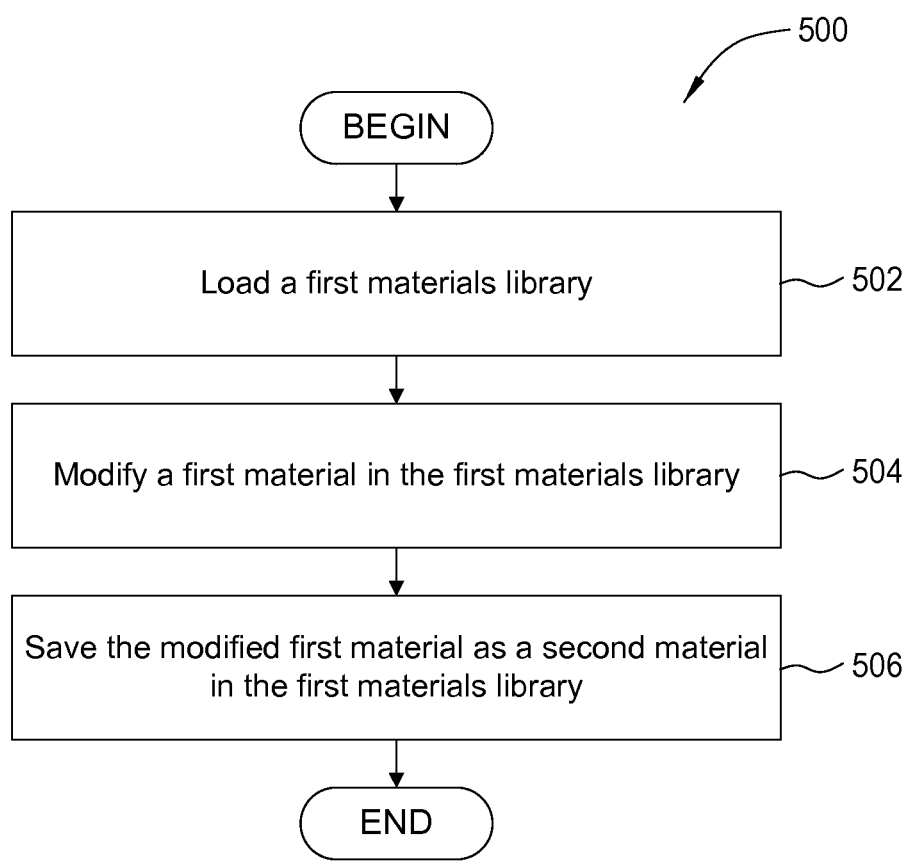
FIG. 5 is a flow chart illustrating a method for creating new materials used with by existing rendering engine, according to one embodiment of the invention.

FIG. 5 is a flow chart illustrating a method 500 for creating new materials for use with an existing rendering engine, according to one embodiment of the invention. Persons skilled in the art will understand that even though the method is described in conjunction with the systems of FIGS. 1 and 2, any system configured to perform the steps of the method illustrated in FIG. 5, in any order, is within the scope of the present invention.

At step 502, the rendering application loads a materials library. The materials library may contain a plurality of materials to be rendered using a particular rendering implementation. For example, the materials library may contain materials for rendering brick, concrete, sand, granite, and limestone. Further, each material may be associated with one or more implementations used to render that material on a given rendering engine. As stated, one material may have multiple implementations to provide different levels of rendering quality or to support different versions of an implementation. This may be useful where different techniques are used by the underlying rendering engine to render the same material. In such a case, each implementation may map the strongly-typed material parameters differently, as appropriate for the different underlying rendering techniques.

Figure 6A:
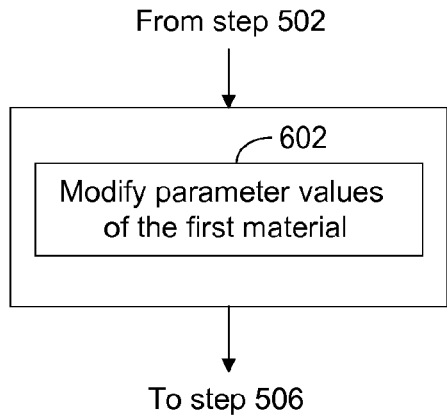
FIGS. 6A-6C illustrate a method for creating new materials for use with an existing rendering engine, according to one embodiment of the invention.
Figure 6B:
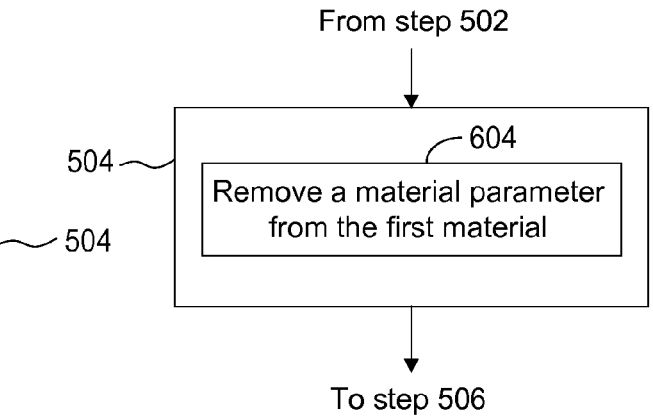
Figure 6C:
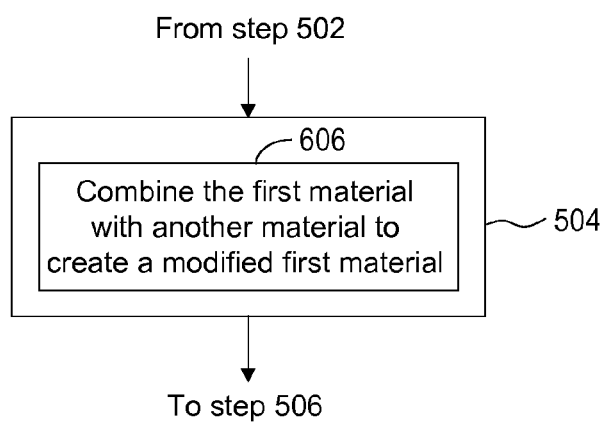

At step 504, a first material from the library is modified. The modification may be in response to user input. For example, the modification may include varying the parameter values of the first material, removing a parameter from the first material, or adding a parameter to the first material. FIGS. 6A-6C, described below, illustrate additional examples of modifying a material. At step 506, the rendering application saves the modified first material as a second material in the materials library. In this manner, a new material is added to the materials library for the particular rendering implementation.

FIGS. 6A-6C illustrate a method for creating new materials for use with an existing rendering engine, according to one embodiment of the invention. Method steps 602, 604, and 606, shown in FIGS. 6A, 6B, and 6C, respectively, illustrate different examples of modifications to existing materials (step 504 of FIG. 5). The modifications described in FIGS. 6A-6C are each simple enough for a user with no programming experience. In FIG. 6A, at step 602, the parameter values of the first material are modified. The modification may be in response to user input. For example, a first material may be red wall paint with high gloss finish that is modified to have a red-orange color and matte finish. The modified first material may then be saved as a second material in step 506. In the wall paint example, the red-orange matte material can then be saved back to the library.

In FIG. 6B, at step 604, a material parameter is removed from the first material. The removal may be in response to user input. The modified first material may then be saved as a second material in step 506. For example, a first material may be green wall paint with high gloss finish that is modified to remove the "finish" parameter. The modification performed at step 604 effectively creates a new material, where some material parameter can no longer be changed. Removing the material parameter from the user-editable parameters causes that material parameter to be constant, regardless of any other modifications made to the other material parameters. Thus, in the example above where the "finish" parameter is removed, the other parameters remain editable, but finish is constantly set to "high gloss."

In FIG. 6C, at step 606, a first material is combined with another material to create a modified first material. The combination may be in response to user input. The modified first material may then be saved as a second material in step 506. The modification described in FIG. 6C creates a new material that combines the parameters and characteristics of the two combined materials. For example, the first material may be a wall paint material and the second material may be an image material that tiles an image across a surface. When the two materials are combined, the resulting material provide a wall paint material having all of the typical wall paint parameters, that when applied to a surface, may be rendered as a wall paint that tiles the image of the second material.

In another embodiment (not shown), a user may create a completely new material object. For example, a user may write a procedural texture using a programming language, for example, C++, or high level shading language (e.g., HLSL) and compile the code to create completely new material. In such a case, the user may also write a corresponding implementation object that maps the new material object and input parameters to parameters appropriate for one or more underlying rendering engines. The new materials object may then be added to a materials library. The next time the rendering application is loaded, the new material is available for use in rendering operations.

Advantageously, the method described in FIGS. 5 and 6A-6C allows users to create different materials by providing top-level constructs. Further, users may build new materials from those constructs and associate them with different rendering implementations. In this manner, users may extend the rendering application is by creating new materials for an existing rendering implementation. Furthermore, users may extend the rendering application with new rendering implementations and engines for an existing material. Thus, the rendering framework allows each rendering engine to be installed separately and at different times.

Figure 7:
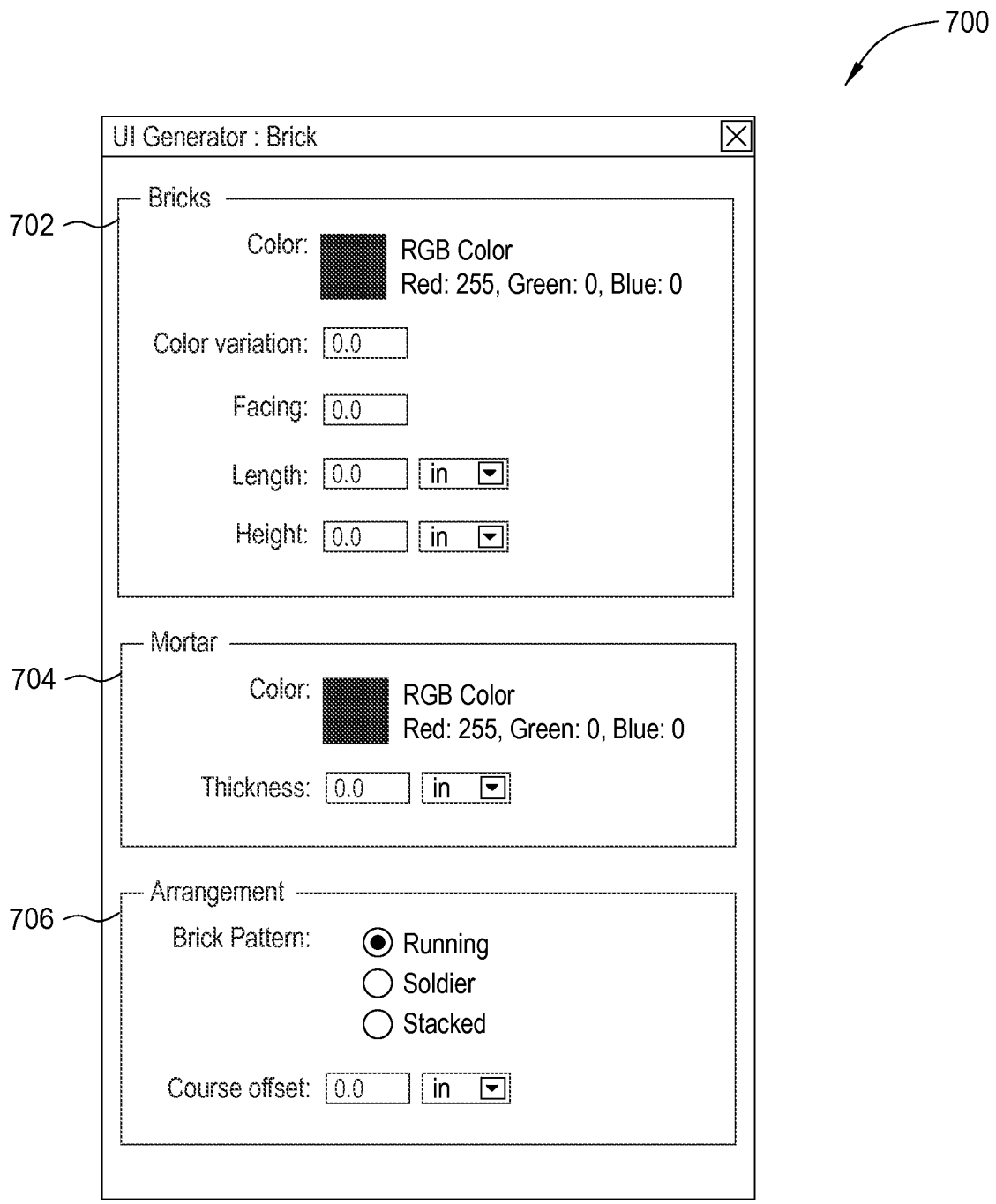
FIG. 7 is a screen shot illustrating a user interface for a brick material, according to one embodiment of the invention.

FIG. 7 is a screen shot illustrating an example user interface 700 for a brick material, according to one embodiment of the invention. In this example, the user interface 700 displays three categories, a brick category 702, a mortar category 704, and an arrangement category 706. Illustratively, the bricks category 702 provides editable material parameters of color, color variation, facing, brick length, and brick height. The mortar category 704 provides editable material parameters of color and mortar thickness. The arrangement category 706 provides editable material parameters of brick pattern and course offset. Persons skilled in the art will recognize that even though the brick material user interface 700 is described with these specific editable user parameters, other user parameters may be used within the scope of the present invention. More generally, as described above, the editable material parameters may be both strongly-typed and tailored to the properties of the actual material represented by a given material object. Thus, in various embodiments, a user may achieve a desired rendering effect by modifying the material parameters shown in FIG. 7. As described above, the user may create a new brick material (i.e., "Brick 2") using the method of FIGS. 5 and 6A-6C.

As described, embodiments of the invention provide a renderer-agnostic method for representing materials independently from an underlying rendering engine. Advantageously, material libraries may be extended with new materials for rendering with an existing rendering engine and implementation. Also, new rendering engines and implementations may be added for existing materials. Thus, at run-time, rather than limiting the rendering to being performed on a pre-determined rendering engine, the rendering application may efficiently and conveniently manage rendering a graphics scene on a plurality of rendering engines or implementations. Further, by providing a common frontend for a given material using an interface object and a set of strongly-typed parameters for that material, any number of different implementations for a given rendering engine (or different rendering engines) may be used to render that material without a user having to understand each particular implementation or to learn how to use each independent rendering engine. Instead, the universal frontend simply presents the available materials using the parameters representative of each given material. During rendering, the implementation of each given material is used to translate the strongly-typed parameters of the materials object into a form needed by a selected rendering engine.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for creating materials applied to geometry within a graphics scene when rendering the graphics scene using a first rendering engine, comprising:
   loading a materials library that includes a definition for each material in a plurality of materials, wherein the definition for each of the materials includes a set of strongly-typed parameters representing appearance characteristics of a material and specifies one or more rendering implementations associated with the material, wherein each rendering implementation is configured to translate the strongly-typed parameters associated with a particular material into a first rendering format compatible with the first rendering engine, and wherein the first rendering engine is configured to support at least two rendering formats, and a speed associated with the first rendering format is faster than a speed associated with a second rendering format;
   receiving a selection of a first material from the materials library;
   receiving a modification to the definition of the first material; and
   storing the modified first material in the materials library, in addition to the first material.

2. The method of claim 1, wherein the strongly-typed parameters of a material describe a visual color and surface texture of the material.

3. The method of claim 1, wherein receiving a modification to the definition of the first material comprises receiving a parameter value to use for one of the strongly-typed parameters associated with the first material each time the first material is applied to geometry within the graphics scene during a rendering operation.

4. The method of claim 1, wherein receiving a modification to the definition of the first material comprises removing one of the strongly-typed parameters from the definition of the first material.

5. The method of claim 1, wherein receiving a modification to the definition of the first material comprises adding an additional strongly-typed parameter to the definition of the first material.

6. The method of claim 1, wherein receiving a modification to the definition of the first material comprises receiving an additional rendering implementation associated with the first material compatible with the first rendering engine.

7. The method of claim 1, wherein receiving a modification to the definition of the first material comprises combining the definition of the first material with a definition of a second material.

8. The method of claim 1, wherein receiving a modification to the definition of the first material comprises receiving an additional rendering implementation associated with the first material compatible with a second rendering engine.

9. A non-transitory computer-readable storage medium storing instructions that when executed by a processor cause the processor to perform an operation for creating materials applied to geometry in a graphics scene when rendering the scene using a first rendering engine by performing the steps of:
  loading a selected materials library that includes a definition for each material in a plurality of materials, wherein the definition for each of the materials includes a set of strongly-typed parameters representing appearance characteristics of a material and specifies one or more rendering implementations associated with the material, wherein each rendering implementation is configured to translate the strongly-typed parameters associated with a particular material into a first rendering format compatible with the first rendering engine, and wherein the first rendering engine is configured to support at least two rendering formats, and a speed associated with the first rendering format is faster than a speed associated with a second rendering format;
  receiving a selection of a first material from the materials library;
  receiving a modification to the definition of the first material; and
  storing the modified first material in the materials library, in addition to the first material.

10. The non-transitory computer-readable storage medium of claim 9, wherein the strongly-typed parameters of a material describe a visual color and surface texture of the material.

11. The non-transitory computer-readable storage medium of claim 9, wherein receiving a modification to the definition of the first material comprises receiving a parameter value to use for one of the strongly-typed parameters associated with the first material each time the first material is applied to geometry within the graphics scene during a rendering operation.

12. The non-transitory computer-readable storage medium of claim 9, wherein receiving a modification to the definition of the first material comprises removing one of the strongly-typed parameters from the definition of the first material.

13. The non-transitory computer-readable storage medium of claim 9, wherein receiving a modification to the definition of the first material comprises adding an additional strongly-typed parameter to the definition of the first material.

14. The non-transitory computer-readable storage medium of claim 9, wherein receiving a modification to the definition of the first material comprises receiving an additional rendering implementation associated with the first material compatible with the first rendering engine.

15. The non-transitory computer-readable storage medium of claim 9, wherein receiving a modification to the definition of the first material comprises combining the definition of the first material with a definition of a second material.

16. The non-transitory computer-readable storage medium of claim 9, wherein receiving a modification to the definition of the first material comprises receiving an additional rendering implementation associated with the first material compatible with a second rendering engine.

17. The non-transitory computer-readable storage medium of claim 9, wherein the strongly-typed parameters of the first material represent different types of appearance characteristics from the strongly-typed parameters of a second material.

18. The non-transitory computer-readable storage medium of claim 9, wherein the set of strongly-typed parameters describes the appearance of the first material when the first material is applied to geometry within the graphics scene during a rendering operation.

19. A method for creating materials applied to geometry within a graphics scene when rendering the graphics scene using a first rendering engine, comprising:
  specifying a selection of a materials library that includes a definition for each material in a plurality of materials, wherein the definition for each of the materials includes a set of strongly-typed parameters representing appearance characteristics of a material and specifies one or more rendering implementations associated with the material, wherein each rendering implementation is configured to translate the strongly-typed parameters associated with a particular material into a first rendering format compatible with the first rendering engine, and wherein the first rendering engine is configured to support at least two rendering formats, and a speed associated with the first rendering format is faster than a speed associated with a second rendering format; and
  invoking a rendering tool provided by a universal rendering frontend, wherein the universal rendering frontend is configured to:
    receive a selection of a first material from the materials library, receive a modification to the definition of the first material, and
    store the modified first material in the materials library, in addition to the first material.

20. The method of claim 19, wherein the strongly-typed parameters of a material describe a visual color and surface texture of the material.

21. The method of claim 19, wherein receiving a modification to the definition of the first material comprises receiving a parameter value to use for one of the strongly-typed parameters associated with the first material each time the first material is applied to geometry within the graphics scene during a rendering operation.

22. The method of claim 19, wherein receiving a modification to the definition of the first material comprises removing one of the strongly-typed parameters from the definition of the first material.

23. The method of claim 19, wherein receiving a modification to the definition of the first material comprises adding an additional strongly-typed parameter to the definition of the first material.

24. The method of claim 19, wherein receiving a modification to the definition of the first material comprises receiving an additional rendering implementation associated with the first material compatible with the first rendering engine.

25. The method of claim 19, wherein receiving a modification to the definition of the first material comprises combining the definition of the first material with a definition of a second material.

26. The method of claim 19, wherein receiving a modification to the definition of the first material comprises receiving an additional rendering implementation associated with the first material compatible with a second rendering engine.

* * * * *